US008900659B2

United States Patent
Zeng et al.

(10) Patent No.: US 8,900,659 B2
(45) Date of Patent: Dec. 2, 2014

(54) METAL NANOWIRES, NANOMESH, AND A METHOD OF FABRICATION

(75) Inventors: Hua Chun Zeng, Singapore (SG); Shengmao Zhang, Kaifeng (CN); Yu Chang, Singapore (SG); Mei Ling Lye, Singapore (SG)

(73) Assignee: National University of Signapore, Singapore (SG)

( * ) Notice: Subject to any disclaimer, the term of this patent is extended or adjusted under 35 U.S.C. 154(b) by 10 days.

(21) Appl. No.: 13/811,259

(22) PCT Filed: Jul. 19, 2011

(86) PCT No.: PCT/SG2011/000257
§ 371 (c)(1),
(2), (4) Date: Jan. 19, 2013

(87) PCT Pub. No.: WO2012/060776
PCT Pub. Date: May 10, 2012

(65) Prior Publication Data
US 2013/0118775 A1    May 16, 2013

Related U.S. Application Data

(60) Provisional application No. 61/365,423, filed on Jul. 19, 2010.

(51) Int. Cl.
  *B05D 7/00* (2006.01)
  *H01B 5/00* (2006.01)
  *D01F 9/08* (2006.01)
  *B05D 3/00* (2006.01)
  *B05D 5/12* (2006.01)
  *B32B 15/14* (2006.01)
  *B32B 37/02* (2006.01)
  *H01B 1/16* (2006.01)
  *B22F 1/00* (2006.01)
  *B22F 1/02* (2006.01)
  *B22F 3/00* (2006.01)
  *B22F 9/24* (2006.01)

(52) U.S. Cl.
  CPC  *D01F 9/08* (2013.01); *B05D 3/207* (2013.01); *B05D 5/12* (2013.01); *B32B 15/14* (2013.01); *B32B 37/02* (2013.01); *H01B 1/16* (2013.01); *B22F 1/0025* (2013.01); *B22F 1/025* (2013.01); *B22F 3/002* (2013.01); *B22F 9/24* (2013.01)
  USPC .................................. 427/217; 174/126.2

(58) Field of Classification Search
  CPC ............ B05D 3/207; B05D 5/12; H01B 1/16; B32B 15/14; B32B 37/02; D01F 9/08
  USPC .................................. 427/217; 174/126.2
  See application file for complete search history.

(56) References Cited

FOREIGN PATENT DOCUMENTS

| KR | 20100079781 A | 7/2010 |
|---|---|---|
| WO | 2005005687 A1 | 1/2005 |
| WO | 2012060776 A1 | 5/2012 |

OTHER PUBLICATIONS

Chang et al., "Large-Scale Synthesis of High-Quality Ultralong Copper Nanowires", Langmuir, 21, Mar. 11, 2005, p. 3746-3748.*

(Continued)

*Primary Examiner* — Timothy Meeks
*Assistant Examiner* — Ann Disarro

(57) ABSTRACT

The present invention relates to a method of forming copper nanowires with a metallic coating. In a preferred embodiment, the metallic coating is copper. Due to the metal coating, the nanowires become magnetically guidable and chemically stable. As such, the nanowires can be used to form nanomesh. Further, the nanowire and nanomesh of the present invention can be used as transparent electrodes that are used in TV, PC, touch-control, and solar industries.

20 Claims, 8 Drawing Sheets

(56) References Cited

OTHER PUBLICATIONS

Grouchko et al., "Formation of Air-Stable Copper-Silver Core-Shell Nanoparticles for Inkjet Printing", Journal of Materials Chemistry 19, Mar. 17, 2009, pp. 3057-3062.*

Foreign Communication From a Related Counterpart Application—International Search Report and Written Opinion, PCT/SG2011/000257, Sep. 13, 2011.

Foreign Communication From a Related Counterpart Application—International Preliminary Report on Patentability, PCT/SG2011/000257, Jan. 31, 2013.

Zeng, Hua Chen, et al., U.S. Provisional Patent Application entitled, Wet Synthesis of Chemically Stable Copper Nanowires for T Ransparent Conducting Electrodes and Other Electrical Interconnect Applications, U.S. Appl. No. 61/365,423, filed Jul. 19, 2010.

Lee, J.Y., et al., "Solution-Processed Metal Nanowire Mesh Transparent Electrodes", Nano letters, vol. 8, No. 2, pp. 689-692, 2008.

Athanassiou, E. K., et al., "Template Free, Large Scale Synthesis of Cobalt Nanowires Using Magnetic Fields for Alignment," Nanotechnology, vol. 18, pp. 165606-165612, 2007.

* cited by examiner

400

Nanowires in polymer

410

⇩ Slicing and polishing

Thin plates of nanomesh inside a polymer block

420

⇩ Removal of polymer

Thin plates of nanomesh

430

For flexible substrates:

For rigid substrates:

METAL NANOWIRES, NANOMESH, AND A METHOD OF FABRICATION

CROSS-REFERENCE TO RELATED APPLICATIONS

This application is a filing under 35 U.S.C. 371 as the National Stage of International Application No. PCT/SG2011/000257, filed Jul. 19, 2011, entitled "METAL NANOWIRES, NANOMESH, AND A METHOD OF FABRICATION," which claims the benefit of and priority to U.S. Provisional Patent Application No. 61/365,423, filed Jul. 19, 2010 and entitled "METAL NANOWIRES, NANOMESH, AND A METHOD OF FABRICATION", both of which are incorporated herein by reference in their entirety for all purposes.

FIELD OF THE INVENTION

The present invention relates to metal nanowires, nanotech, and a method of fabrication.

BACKGROUND OF THE INVENTION

Copper (Cu) is one of the most important metals in modern technologies. In nanotechnology (e.g., nano-optoelectronic industry), fabrication of one-dimensional (1D) nanomaterials of copper (wires/cables/rods) have received considerable attention in recent years. A number of fabrication methods have been proposed including electrochemical reactions, vapor depositions, soft and hard template processes, reverse micellar systems, etc. So far, effective methods for large-scale production of high quality nanostructured copper or metal nanowires with precise morphological control have not been realized. Fabrication problems may include short length, non-linear morphology, polydispersivity, poor crystallinity, low yield, and/or process complexity.

Conventionally, copper nanowires have been prepared by the synthesis of sodium hydroxide and cupric nitrate (an aqueous solution) in a glass reactor. The general redox reaction is:

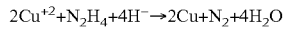

$$2Cu^{+2}+N_2H_4+4H^-\rightarrow 2Cu+N_2+4H_2O$$

In "Large-Scale Synthesis of High-Quality Ultralong Copper Nanowires," *Langmuir* 2005, Volume 21, pp. 3746-3748, Yu Chang, Mei Ling Lye, and Hua Chun Zeng, varying amounts of ethylenediamine (EDA) and hydrazine are added sequentially to the aqueous solution, followed by a thorough mixing of all of the reagents. The reactor was then placed in a water bath with a temperature control over 25-100° C. for 15 minutes to 15 hours. The copper products were washed and harvested with centrifugation-redispersion cycles and stored in a water/hydrazine solution to prevent oxidation. The prepared nanowires are straight with constant diameters in the range of 60-160 nm. The length of the nanowires is greater than 40 μm, which corresponds to an aspect ratio of greater than 350. Further, Chang et al. discusses forming single crystalline nanowires with high lattice perfection. One of the disadvantages of the copper nanowire described in the "Large-Scale Synthesis of High-Quality Ultralong Copper Nanowires" is the surface oxidation of copper. Further, the nanowires discussed in "Large-Scale Synthesis of High-Quality Ultralong Copper Nanowires" do not possess additional functionalities to meet their future new applications.

However, there is still a need in this technical field for improved methods for the preparation of copper (Cu) nanowires, nanotubes, and nanorods.

SUMMARY OF INVENTION

The present invention relates to the preparation of metal nanowires and their method of fabrication. In particular, copper (Cu) nanowires with metal surface coatings are prepared under simple reaction conditions. The prepared metal nanowires can be used as a substitute material for expensive indium-tin-oxide (ITO) in general application of transparent conducting electrodes.

According to a first aspect there is provided a method of making a plurality of metal-coated copper nanowires according to claim 1.

According to a second aspect there is provided a nanowire according to claim 23.

According to a third aspect there is provided a display panel according to claim 23.

BRIEF DESCRIPTION OF THE DRAWINGS

The accompanying figures, which are incorporated in and constitute a part of this specification, illustrate aspects of the invention and, together with a general description of the invention given above, and the detailed description given below, serve to explain the invention.

DETAILED DESCRIPTION OF THE INVENTION

Figure 1:
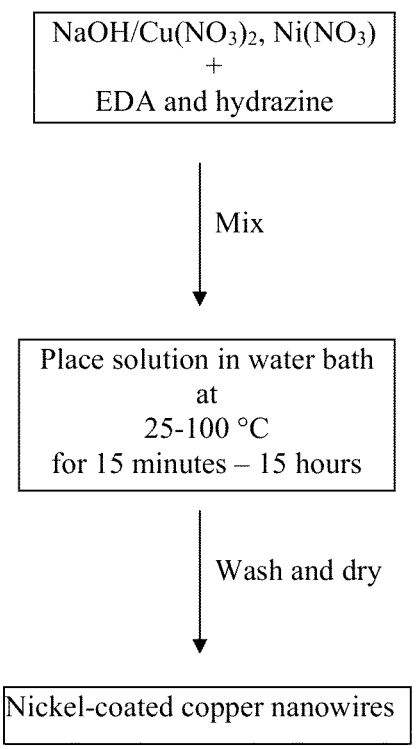
FIG. 1 is a simplified block diagram of the wet synthesis redox reaction of nickel-coated copper nanowires.

In the present invention, high-quality ultra-long copper nanowires (all free-standing: 90-120 nm in diameter, 10-200 μm in length; aspect ratio >350-450) are synthesized in large-scale with a facile aqueous reduction route at low temperatures.

However, in order to avoid the oxidation of copper during the production processes, coating processes were developed to introduce chemically stable metal coatings to the copper nanowires in the present invention. Two kinds of synthetic approaches can be summarized for making metal nanowires: single-charge and multiple-charges of precursor chemicals in redox reactions. More importantly, in the present invention, ferromagnetic nickel (Ni) is introduced as an overcoat material to the copper nanowires, which transforms diamagnetic copper nanowires to become magnetically guidable for self-assembly and enhances chemical stability of copper nanowires.

The approach and methodology of the present invention is to use low cost chemicals to make chemically stable copper nanowires and their related derivatives. The major problem of the existing copper nanowires is that they are easily oxidized with at least one layer of surface oxides, which lowers the conductivity of copper. Thus, the surface oxidation hampers the practical applications of the copper nanowires.

In an aspect of the present invention, a nickel (Ni) metallic coating is formed on copper nanowires. Because nickel is ferromagnetic and chemically more inert than copper toward oxygen and other oxidative species, this new type of Cu@M (where M=metal coating: e.g., Ni) nanowires become magnetically guidable and chemically stable. Compared with the existing copper nanowires, the copper nanowires of the present invention could be applied to a variety of microelectronic devices including TVs, LCD displays, solar cells, smart windows, and the like. In principle, the metal-coated copper nanowires can be used in all known applications of metallic copper.

Known methods of producing metal-coated copper nanowires, such as, those described in Solution-Based Epitaxial Growth of Magnetically Responsive Cu@Ni Nanowires" (Chem. Mater. 2010, Volume 22, pp. 1282-1284, Shengmao Zhang, and Hua Chun Zeng) and "The Growth Mechanism of Copper Nanowires and Their Properties in Flexible, Transparent Conducting Films" (Adv. Mater. 2010, Volume 22, pp. 3558-3563, Aaron R. Rathmell, Stephen M. Bergin, Yi-Lei Hua, Zhi-Yuan Li, and Benjamin J. Wiley, are incorporated by reference herein.

"Solution-Based Epitaxial Growth of Magnetically Responsive Cu@Ni Nanowires" (Chem. Mater. 2010, Volume 22, pp. 1282-1284, Shengmao Zhang, and Hua Chun Zeng) describes coating ferromagnetic nickel (Ni) on copper (Cu) nanowires to facilitate the self-assembly of circuit and device fabrications. The nickel (Ni) coated copper nanowires are synthesized in an aqueous solution of sodium hydroxide (NaOH), cupric nitrate $Cu(NO_3)_2$, and nickel nitrate $Ni(NO_3)_2$. The redox reactions are:

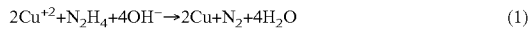

$$2Cu^{+2} + N_2H_4 + 4OH^- \rightarrow 2Cu + N_2 + 4H_2O \qquad (1)$$

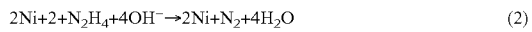

$$2Ni+2 + N_2H_4 + 4OH^- \rightarrow 2Ni + N_2 + 4H_2O \qquad (2)$$

The resulting nickel-coated copper nanowires are straight, and have a diameter in the range of 200-300 nm and lengths of more than several tens of micrometers. The nickel-coated copper nanowires may form a lattice. The nickel-coated copper nanowires exhibit an improved coercivity due to the nickel overcoat. Further, the nickel-coated copper nanowires respond effectively to an external magnet that self aligns the nanowires when a magnetic field is applied. Thus, the magnetically responsive nickel-coated copper nanowires may find applications in circuit and device fabrications using the described self-assembly approach of Zhang et al.

In "The Growth Mechanism of Copper Nanowires and Their Properties in Flexible, Transparent Conducting Films" (Adv. Mater. 2010, Volume 22, pp. 3558-3563, Aaron R. Rathmell, Stephen M. Bergin, Yi-Lei Hua, Zhi-Yuan Li, and Benjamin J. Wiley, the transmittance of conductive copper nanowires was measured to be over 80% by reducing the aggregation of the nanowires. As acknowledged by Rathmell et al., the process to synthesize copper nanowires was developed by Zeng et al. "The Growth Mechanism of Copper Nanowires and Their Properties in Flexible, Transparent Conducting Films" describes increasing the transmittance of copper nanowires by decreasing the density of the nanowires. However, there still is a need in this technical field for improved methods of increasing the transparency of nanowires.

In addition to the novel synthetic approaches, several practical approaches for making transparent conducting electrodes with the nanowires of the present invention are addressed. Specifically, the nickel-coated copper nanowires of the present invention are used to produce low-cost transparent conducting electrodes in replacement of expensive indium-tin-oxide (ITO) films. Indium-tin-oxide (ITO) is widely used in TV, PC, touch-control screens, and photovoltaic industries. The following examples indicate that the present invention using common and low-cost chemicals produces chemically stable copper nanowires.

The present invention relates to a method of making a plurality of copper nanowires, in particular, metal coated copper nanowires. The copper nanowires may be coated with any suitable metallic material including gold (Au), silver (Ag), platinum (Pt), palladium (Pd), rhodium (Rh), ruthenium (Ru), or nickel (Ni) during an oxidation/reduction reaction or redox reaction.

In particular, the nickel (Ni) coated copper nanowires of the present invention are formed by the redox reaction of an aqueous solution of sodium hydroxide, cupric nitrate, and nickel nitrate in a glass reactor. The resulting nickel (Ni) coated copper nanowires can be arranged to form a conductive structure. Because each nickel (Ni) coated copper nanowire is conductive, arranging the nanowires to overlap and contact each other forms a conducting mesh-like structure. A space is provided between each intersecting nanowire and creates a hole. Collectively, the spaces between the nanowires form a grid. Thus, the nanowires can be arranged to form a nanomesh.

In the present invention, the nanowires can be magnetically or non-magnetically aligned. In another aspect of the present invention, the nanowires in the nanomesh can be magnetically or non-magnetically aligned. The resulting nanomesh (aligned or non-aligned) can be used as layers, stacked upon another, and annealed to create better adhesion among the nanowires and respective nanomesh layers.

FIG. 1 shows the wet synthesis reaction of the present invention. Sodium hydroxide, cupric nitrate, and nickel nitrate are combined in a single reactor. Small amounts of EDA and hydrazine are added to the solution sequentially. This is followed by a thorough mixing of all of the reagents. The reactor was then placed in a water bath with a temperature control over 25-100° C. for 15 minutes to 15 hours. The copper products were washed and harvested with centrifugation-redispersion cycles and stored in a water/hydrazine solution to prevent oxidation. Because the sodium hydroxide is not consumed, the solution is recyclable and the redox reaction can be a batch process as well as a continuous process. Further, the remaining EDA after reaction can also be reused in subsequent production processes.

Figure 2:
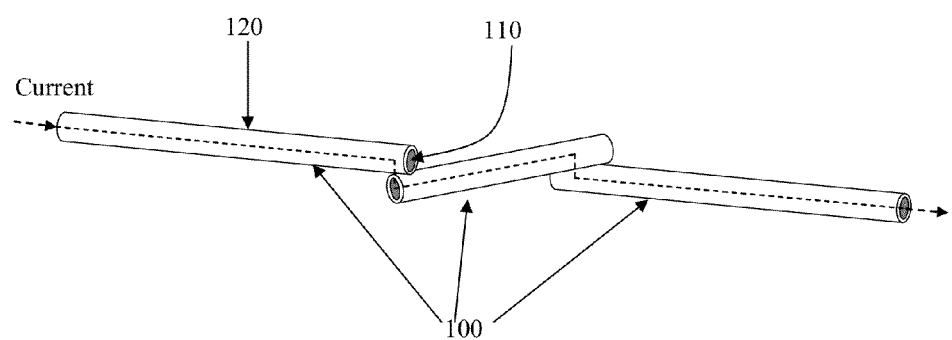
FIG. 2 illustrates the as-synthesized, coated metal nanowires of the present invention forming a conductive path for the flow of current where plurality of copper nanowires are coated with nickel.

FIG. 2 shows copper nanowires (100) where the copper phase (110) is protected by its metallic surface coating (120) represented by Cu@M. In the present invention, the metallic surface coating (M) includes Gold (Au), Silver (Ag), Platinum (Pt), Palladium (Pd), Rhodium (Rh), Ruthenium (Ru), or Nickel (Ni). The overall electrical conductivity is still largely determined by the copper, as the current path in the M-phase (i.e., two times of the thickness of nickel shell) is short compared to the lengths of copper nanowires. A nickel coating prevents the formation of copper oxides and will significantly reduce the juncture resistance. The nickel coating of the copper nanowire also allows the nanowire to be magnetically guidable. Thus, alignment of a nickel-coated copper nanowire is achieved.

Figure 3:
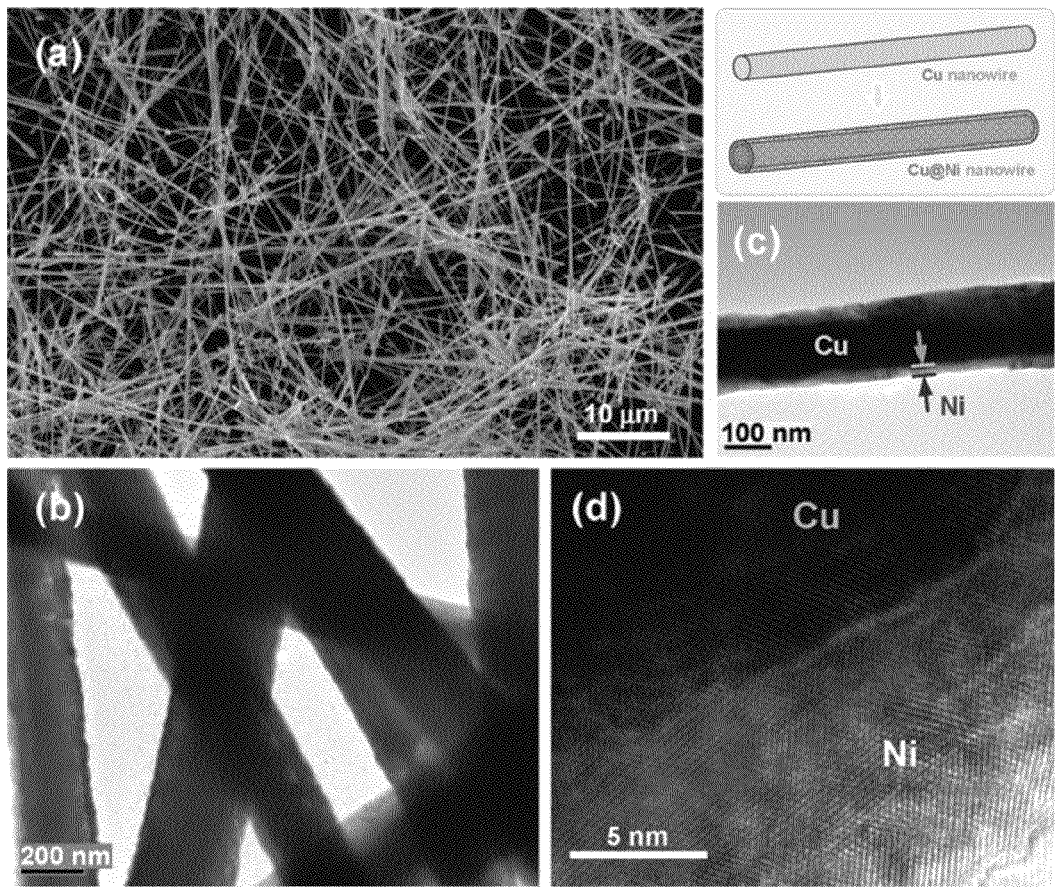
FIG. 3 illustrates the SEM, TEM, and HRTEM images of the as-prepared Cu@Ni nanowires.

Illustrated in FIG. 3, the central Cu core is first formed, followed by a deposition of Ni sheath. More importantly, both the Cu cores and deposited Ni are essentially single-crystalline, as revealed by the HRTEM investigation (FIG. 3d and SAED result). In particular, the metal overcoat (Ni) shows an epitaxial extension from the copper substrate although the lattice fringes in the interfacial regions (FIG. 3d) are not exactly matched due to difference in lattice constants in the two face-centered cubic (fcc) transition metals (Cu: space group Fm$\bar{3}$m; $a_0$=3.615 Å; JCPDS file No. 89-2838. Ni: space group Fm$\bar{3}$m; $a_0$=3.523 Å; JCPDS file No. 87-0712).

To confirm the composite nature of Cu@Ni nanowires, XRD patterns, EDX line analysis and chemical mappings of our prepared samples were obtained. FIG. 4a shows a progressive generation of the two transition metals. The Cu phase was formed after a reaction time of 25 minutes, and the nickel phase was observed 20 min later. Two sets of major diffraction peaks of (111), (200), and (220) are well-resolved, confirming that both metals have the same fcc crystal system. Across the radial direction of a Cu@Ni nanowire (see the dashed line in FIG. 4b), $K_{\alpha 1}$ elemental line profiles clearly indicate that copper element has a maximum value in the center whereas the nickel has two maxima on both sides of this binary nanocomposite; the sheathed structure in the Cu@Ni nanowires is thus established. Further, chemical mapping images of the two metal elements in the nanowire also draw identical structural information (FIG. 4b).

Because they have similar lattice parameters, copper and nickel are generally thought to exhibit solid solubility across the whole compositional range (Cullity, B. D.; Graham, C. D. Introduction to Magnetic Materials, 2nd Ed.; Wiley-IEEE: New York, 2008). For instance, Cu—Ni alloy and composite nanocrystallites have been prepared, respectively, by reduction of $Ni^{2+}$ and $Cu^{2+}$ with $N_2H_4$ using water-in-oil microemulsion technique (Feng, J.; Zhang, C.-P. J. Colloid Interface Sci. 2006, 293, 414-420). It has been found that the composition and size of Cu—Ni alloy or composite nanoparticles depend on the mole ratio of $H_2O$ to sodium dodecyl sulfate, the method of addition of $Cu^{2+}$ and $Ni^{2+}$, and the mole ratio of $Cu^{2+}$ and $Ni^{2+}$ in the initial precursor solution (Feng, J.; Zhang, C.-P. J. Colloid Interface Sci. 2006, 293, 414-420). In our present synthesis, a strong basic condition was adopted, and the formation of the two metallic transition metals depends on the following redox reactions:

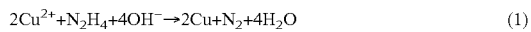

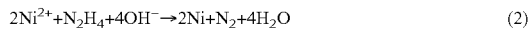

Figure 4:
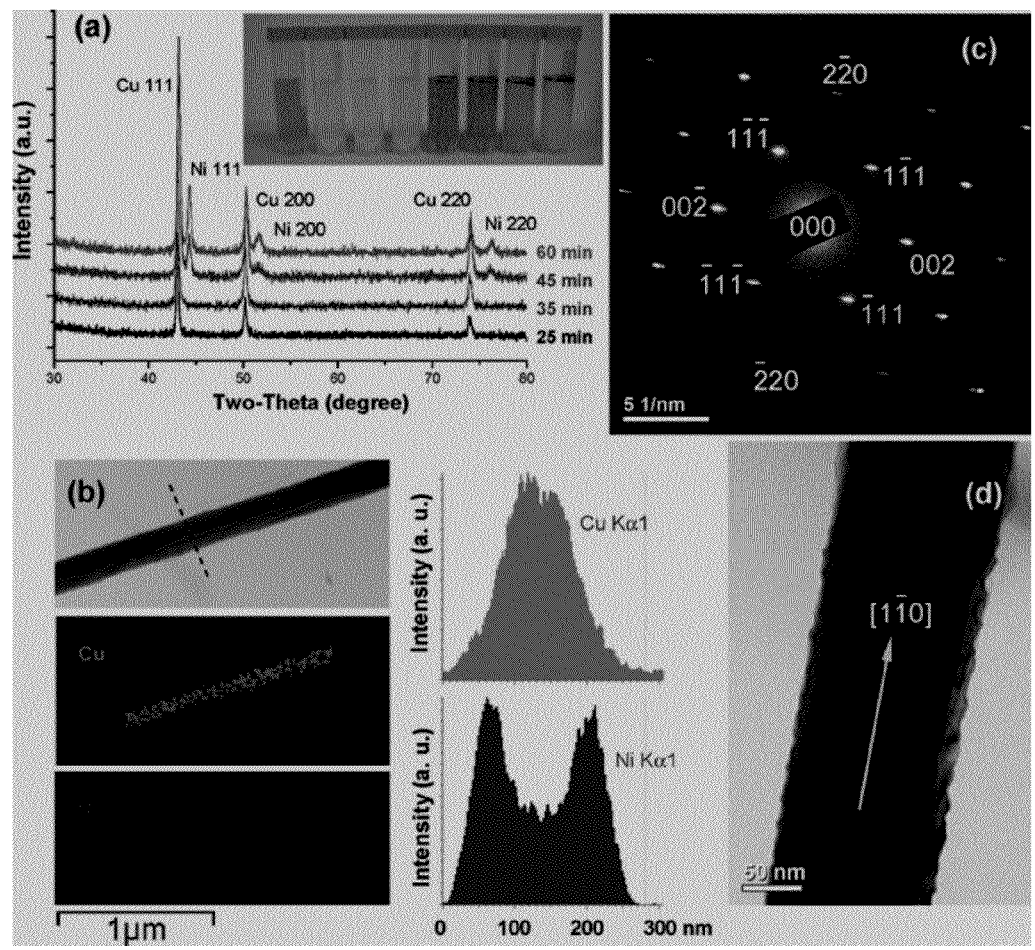
FIG. 4 illustrates the XRD patterns, EDX line analysis, SAED pattern, and chemical mappings of the as-prepared Cu@Ni nanowires.

The standard reduction potential of copper $[E^0(Cu^{2+}/Cu^0)=+0.337$ V is higher than that of nickel $[E^0(Ni^{2+}/Ni^0)=-0.257$ V], and copper is thus easier to be reduced in competitive redox reactions. On the basis of our findings, it is thought that the copper complexes are more reducible toward hydrazine, since the copper phase is formed before the nickel under identical conditions. According to coordination chemistry of the two transition metals, complexes such as $Cu(OH)_4^{2-}$ and $Cu(EDA)_2^{2+}$ are expected to be present in solution precursors, together with $Ni(EDA)_3^{2+}$, which is less reducible (Chang, Y.; Lye, M. L.; Zeng, H. C. Langmuir 2005, 21, 3746-3748, Zhang, S.; Zeng, H. C. Chem. Mater. 2009, 21, 871-883). Consistent with this analysis, the color change of the product solution is a blue-purple ($Cu(OH)_4^{2-}$, $Cu(EDA)_2^{2+}$, and $Ni(EDA)_3^{2+}$) to light purple (in which $Ni(EDA)_3^{2+}$ was left, where blue-colored copper complexes were reduced to metallic nuclei), to reddish brown (Cu nanowires), and to black (Cu@Ni nanowires) (FIG. 4).

The XPS analysis on the as formed Cu nanowires confirms that there is indeed no nickel inclusion in the nanowires prior to the formation of nickel overcoat, which rules out the possibility of Cu—Ni alloy formation. The reductive conversion of $Cu^{2+}$ and $Ni^{2+}$ to metallic copper and nickel in this synthetic route is about 100%, which was indicated by the change in colour of the parent liquid (FIG. 4a), ICP, and EDX analysis.

In FIGS. 4c and 4d, the SAED pattern of a Cu@Ni nanowire is displayed. Because the diffraction pattern can be assigned to (110) zone spots, the single-crystalline nature of the Cu core nanowires is affirmed despite unresolvable diffraction spots of the nickel overcoat. It appears that the growth of the Cu nanowire is along (110) directions, as copper atoms on the (110) crystal planes are coordinately less saturated, compared to other low Miller indexed crystal planes. Effects of experimental conditions on morphology of Cu@Ni products have also been examined. For example, by varying different synthetic parameters and precursor ratios, various product morphologies can be attained from prickly particles, prickly core/shell nanowires to smooth core/shell nanowires.

In a representative synthesis of copper nanowires (Cu nanowires), 20-30 ml of NaOH (3.5-15 M) and 0.5-1.0 mL of $Cu(NO_3)_2$ (0.10 M) aqueous solution were added to a glass reactor (capacity 50 mL). Varying amounts of ethylenediamine (EDA; 0.050-2.0 mL; 99 wt %) and hydrazine (0.020-1.0 mL; 35 wt %) were also added sequentially, followed by a thorough mixing of all reagents. The reactor was then placed in a water bath with temperature control over 25-100° C. (optimized at 60-80° C.) for 15 min to 15 h. Copper products were washed and harvested with centrifugation-redispersion cycles and stored in a water-hydrazine solution to prevent oxidation.

In another aspect of the present invention, the metal-sheathed Cu nanowires (Cu@M nanowires; M=nickel or cobalt, for example) were synthesized with a one-pot (single-loading of precursor chemicals) approach. In a typical synthesis, for example, 30 mL of high concentration NaOH (7.0 M), 0.1-1.0 mL of $Cu(NO_3)_2.3H_2O$ (0.1 M), or 0.07-0.20 mL of $Cu(NO_3)_2.3H_2O$ (0.5 M) and 0.07-0.30 mL of $Ni(NO_3)_2.6H_2O$ (0.5 M) aqueous solutions were added into a plastic reactor with a capacity of 50.0 mL. A varying amount of ethylenediamine (EDA; 0.15-0.50 mL; 99 wt %) and hydrazine ($N_2H_4.H_2O$, 0.025-0.20 mL; 80 wt %) were also added sequentially, followed by thorough mixing of all reagents. Synthetic reactions were carried out at 80° C. for 1 h, after which the reactor was cooled naturally in laboratory air. The products were washed and harvested with centrifugation-redispersion cycles. Table 1 shows the experimental conditions for the formation of nickel (Ni)-coated copper nanowires at 80° C. for 1 hour.

TABLE 1

Formation of Nickel (Ni)-coated Copper nanowires at 80° C. for 1 hour

| Experiment No. | Volume of NaOH aqueous solution (7.0M, mL) | Volume of $Cu(NO_3)_2 \cdot 3H_2O$ aqueous solution (0.5M, mL) | Volume of $Ni(NO_3)_2 \cdot 6H_2O$ aqueous solution (0.5M, mL) | Volume of $N_2H_4 \cdot H_2O$ (80 wt %, mL) | Volume of EDA (99 wt %, mL) | $Cu^{2+}:Ni^{2+}:N_2H_4 \cdot H_2O:EDA$ mole ratio |
|---|---|---|---|---|---|---|
| 81224-1 | 30 | 1.0 | 0.2 | 0.2 | 0.5 | 1:1:32.57:74.88 |
| 81224-2 | 30 | 0.1 | 0.38 | 0.2 | 0.5 | 1:19:325.7:748.8 |
| 81229-5 | 30 | 0.1 | 0.3 | 0.2 | 0.5 | 1:3:65.14:149.76 |
| 90103-3 | 30 | 0.2 | 0.2 | 0.025 | 0.3 | 1:1:4.07:44.93 |
| 90103-4 | 30 | 0.1 | 0.3 | 0.025 | 0.3 | 1:3:8.14:89.86 |
| 90103-5 | 30 | 0.14 | 0.26 | 0.025 | 0.3 | 7:13:40.7:449.25 |
| 90105-2 | 30 | 0.15 | 0.25 | 0.025 | 0.3 | 3:5:16.28:179.7 |
| 90111-2 | 30 | 0.07 | 0.13 | 0.025 | 0.15 | 7:13:81.4:449.25 |
| 90111-3 | 30 | 0.13 | 0.07 | 0.025 | 0.15 | 13:7:81.4:449.25 |

The experiments in Table 1 are divided into two different series according to the concentration of copper solution (i.e., $[Cu^{2+}]=0.1$ M and 0.5 M) used in synthesis. When we used 0.1 M Cu solution, our volume range was 0.1-1.0 mL. However, when we used 0.5 M Cu, our volume range was reduced to 0.07-0.30 mL. The total Copper concentration was about the same in the two situations. The representative sample demonstrated in this invention was from Experiment No. 90111-3 where the mole ratio of $Cu^{2+}/Ni^{2+}=13/7=1.857$ in the starting solution and the mole ratio of Cu/Ni=1.835 in the resultant Cu@Ni nanowires (EDX analytical result). Inductively Coupled Plasma (ICP) analysis of Expt. No. 90111-3 indicate that the concentrations of $Ni^{2+}$ and $Cu^{2+}$ in the solution after reaction were 0.096 mg/L and 0.072 mg/L, respectively, i.e., $1.6 \times 10^{-6}$ mol/L and $1.1 \times 10^{-6}$ mol/L, respectively. The concentrations of $Ni^{2+}$ and $Cu^{2+}$ in the solution before reaction were about $1.17 \times 10^{-3}$ mol/L and $2.17 \times 10^{-3}$ mol/L respectively. Therefore, both $Cu^{2+}$ and $Ni^{2+}$ conversions to metallic phases were almost 100%.

In alternate embodiments, other metals (M), such as, Au, Ag, Pt, Pd, Rh, Ru, or the like can also be coated on the preformed copper nanowires using common metal salts or metal-containing compounds (inorganic or organic) and similar redox reactions. The overall electrical conductivity may be further improved with this type of metal coatings (for example, for those with a conductivity higher than copper). Further, because the above redox reaction is water-based and process temperatures are relatively low, nanowire productions for industrial applications can be easily scaled up under atmospheric conditions (i.e., 1 atm).

Figure 5:
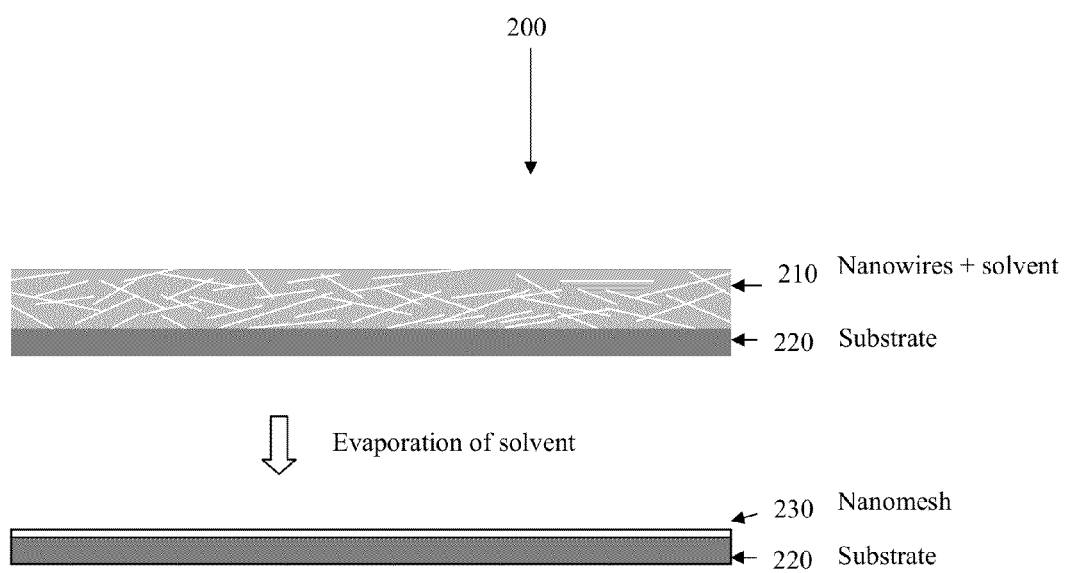
FIG. 5 illustrates the preparation of the as-synthesized nanomesh on a substrate via evaporation of solvent.

FIG. 5 is the side view illustration of the preparation of a nanowire mesh (230) on a substrate (222) via evaporation of solvent. The nanowires are copper nanowires that may be coated with a metal, as shown in FIG. 2. The nanowires are in an aqueous solvent. The solvent composed of the metallic-coated nanowires or copper nanowires (210) is then coated on the substrate (222). Suitable materials for the substrate include flexible or inflexible substrates, such as, plastic or glass. The substrate may be selected from: single crystalline and polycrystalline silicon substrates, including their thin films; organic or inorganic semiconducting materials, including their composites; and all types of polymeric materials and their composites. The temperature of the substrate may be from 70° to 700° C. Other similar processes, such as, printing methods, hard-pressing methods, jointing methods, dip-pulling coating methods, spin-coating methods, and painting methods may be used to deposit the nanowires from the liquid suspension (210) on a substrate (222). If desired, the substrate can be removed and free-standing conductive nanomeshes or electrodes of metal nanowires can thus be fabricated. The solvent is evaporated off leaving a conductive thin film (230) composed of nanowires on the substrate (222).

In order to increase processing ability, appropriate organic additives (e.g., polyvinyl pyrrolidone (PVP)) can be employed. If noble metals are used as coatings for the nanowires, further heat treatments can also be applied to removal organic additives and generate good metal junctions. Further treatments in the formation of the conductive nanomesh having nanowires may include processing methods, for example, oxidative removal of surface organics, and subsequent annealing in a reducing atmosphere, which are able to enhance the electrical contacts among the coated copper nanowires. Better adhesion between the resultant conductive nanomesh and its substrate can also be achieved by thermal pressing in an inert or reducing ambient atmosphere. To generate good contact, the temperature range can be set at 100-700° C., depending on the different product requirements. Pressure can be just normal ambient pressure (i.e., 1 atm) or sub-ambient pressure (lower than 1 atm) depending on different product requirements. Additional sintering at 100-700° C. can also be added if required. When the nanomeshes are treated at high temperature, interconnected contacts will be generated and better conductivity can be expected. If a reducing gas serves as a background ambience, the pristine metal oxides (if any) can be further reduced to metallic layer and thus, better interconnection for the nanomeshes is also expected.

In another aspect of the invention, thermal pressing, sintering or annealing can enhance the interconnectivity among the nanowires. However, thermal pressing (or rolling) also significantly increases the contact between the nanomeshes and their supporting substrates. If managed correctly, thermal pressing alone can generate both good contact among the nanowires in the nanomeshes and good contact between the nanomeshes and their substrates, without additional sintering or annealing.

Further, the higher melting point of nickel allows thermal pressing or sintering to be done more efficiently because compared with copper, the pristine oxide scale on nickel metal surface is much thinner, which makes thermal treatment much easier. Nickel is a good hydrogenation catalyst, which makes it work even better under a reducing atmosphere (such as, in a hydrogen gas background). Substrates used for the assembly of conductive nanomesh of metal nanowires can be commercial optical glasses (e.g., $SiO_2$) or transparent plastic films. Depending on the nanowire structure (e.g., diameter and length) and the metal content in the suspensions, conductive electrodes with different optical transmittances can be attained.

Figure 6:
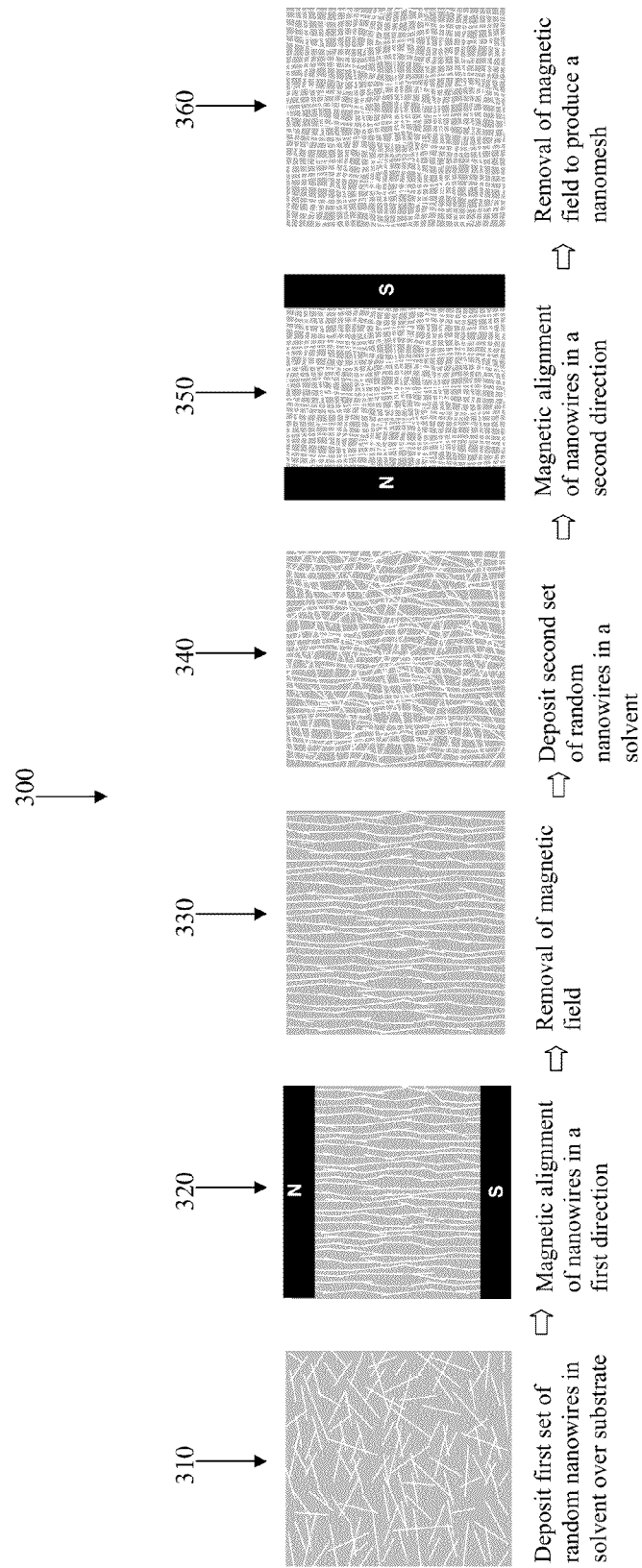
FIG. 6 illustrates the vertical and horizontal alignments of two or more sequentially layered metal nanowires with the assistance of parallel external magnetic fields.

Instead of random arrangements of the metal nanowires of FIG. 5, an ordered arrangement of the nanowires can be achieved with the assistance of external magnetic fields. FIG. 6 shows a process for producing ferromagnetic metal coated copper nanowires (e.g., Cu@Ni nanowires). The adhesion between the nanowires and substrates can be enhanced via further treatments, such as, thermal heating, mechanical pressing, plasma-assisted reduction in reducing ambience. Other magnetic guidable metal nanowires can also be prepared in this way. The substrates can be commercial optical glasses (e.g., $SiO_2$) or transparent plastic films. If desired, the substrates can be further removed and free-standing mesh-like electrodes of metal nanowires can be thus fabricated. Optical transmittance depends on the surface coverage of the nanomesh. If 30% of surface area is occupied by nanowires, the optical transmittance is 70% (i.e., 70% free space for light to go through). The optical transmittance of the nanomesh is in the range of 20-95%.

FIG. 6 is a top view illustration of the process of magnetically aligning metal nanowires. A suspension of nanowires in a solvent (310) is sequentially deposited onto a substrate (not shown). The nanowires are then magnetically aligned when a parallel external magnetic field (320) is applied in a first direction. The nanowires are aligned in a first direction. In alternate embodiments, the nanowires are aligned in a different direction.

Subsequently, the magnetic field is removed from the first set of aligned nanowires (330). The solvent must be removed and thermal pressing is performed in order to form the first aligned set. A second set of random nanowires in solvent is deposited over the first set of aligned nanowires (340).

The second set of random nanowires is magnetically aligned when a parallel external magnetic field (350) is applied in a second direction. In a preferred embodiment, the second direction is perpendicular to the first direction of the magnetic field, as shown in FIG. 6. The magnetic field is removed (360). Thus, transforming at least two sets of random nanowires in solvent to a first and second set of magnetically aligned nanowires. As shown in Step 360, the nanowires overlap and form a mesh-like structure. The spaces between each nanowire create a grid of tiny holes. Current can travel across the nanowires, thus forming a conductive nanomesh. The conductivity of the nanomesh depends on the surface area. The Cu@Ni nanowires have a much better thermal conductivity than indium tin oxide (ITO) because ITO is a binary metal oxide.

The resulting nanomesh is a two dimensional structure while nanowire is a one-dimensional structure. A nanowire alone can connect point A to point B, but a nanomesh can connect an entire surface. Solar cells and display panels belong to two-dimensional structures and devices.

During the fabrication of magnetically aligned nanowires, multiple loadings of the suspension are possible, as illustrated in Step 340 of FIG. 4. Further treatments to the nanowires may include oxidative removal of surface organics and subsequent annealing in a reducing atmosphere, which improve the electrical contact among the coated copper nanowires, which are done after the wires are magnetically aligned. Better adhesion between the resultant nanomesh and its substrate can also be achieved by thermal pressing in an inert or reducing ambience. Even with Ni coating, we still have a very thin layer of nickel oxide (NiO), which reduces electrical conductivity of nanomesh. Therefore, thermal pressing in a reducing atmosphere (e.g., $H_2$) turns NiO into nickel metal and electric conductivity can be significantly improved. The process temperatures can be 100-700° C.

Figure 7:
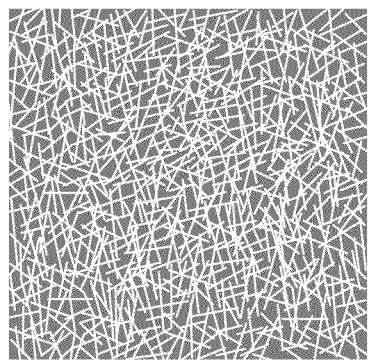
FIG. 7 illustrates the preparation of thin plates of nanomesh where the as-synthesized metal nanowires are embedded inside a polymer as a nanomatrix.
Figure 7:
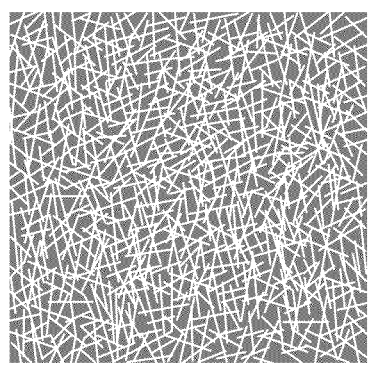
Figure 7:
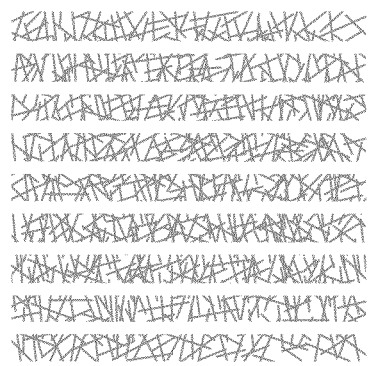

The as-prepared metal nanowires of FIG. 6 can be incorporated into a polymer (e.g., transparent epoxy, etc.), as demonstrated in FIG. 7. Epoxy (polyepoxide) is a common resin used to fix metal sample and it is transparent, which facilitates processing purpose. Any other polymeric materials, which can serve as matrix materials, can also be employed. After certain treatments, such as, heating or UV irradiation heating, the metal nanowires have better interconnection. Heat treatment improves interconnection among the nanowires and results in higher electric conductivity. UV irradiation can also enhance removal of oxide-scale, as hydrogen radicals/atoms generated under UV irradiation are very reactive and oxide-scale can be more facilely removed compared to the case without UV-irradiation.

If managed correctly, thermal pressing alone can generate both good contact among the nanowires in the nanomeshes and good contact between the nanomeshes and their substrates, without additional sintering or annealing. Using standard slicing and polishing techniques, thin plates or sections of metal nanowires encased in polymer (i.e., transparent metal-polymer composites) are prepared. Such metal-polymer composite thin plates would then be an equivalent substitution to commercial indium-tin-oxide (ITO) plate electrodes.

FIG. 7 shows the preparation of composite materials where the as-prepared metal nanowires are imbedded inside a polymer (e.g., epoxy). Due to thorough mixing, good electrical contacts among the nanowires are expected. Further, heating or annealing in a reducing ambient atmosphere will generate stronger conductive networks of the nanowires in the nanomesh. Hydrogen ($H_2$) is the best reducing agent, as it reduces metal oxides to metals and water, which is environmentally friendly. However, in some cases water is not desirable, then carbon monoxide (CO) can then be used. The end products from this process are metals and carbon dioxide ($CO_2$). The difference between the initial nanomesh shown in FIG. 7 to the first set of random wires in solvent (310) found in FIG. 6 is that former is encased in polymer and the latter is deposited in solvent. Both sets of nanowires have a random arrangement and create a conductive nanomesh due to the intersecting nanowires.

Optical transparency can be controlled by the structure (e.g., diameter and length) and the amount of the nanowires in the polymer based upon the size of the holes between each intersecting nanowire. The monoliths or blocks of this type of composite are sliced into thin plates (410). After surface polishing, the resultant thin composite plates are expected to be a substitution for the ITO materials ready for applications (420). When the polymer material is removed from the composites, free-standing conductive nanomatrix is obtained (430). The nanomatrix is characterized by its three-dimensional network of nanowires. On the other hand, the nanomesh in FIG. 6 is a two-dimensional structure and viewed as a net. The nanowires in FIG. 6 in step (310) can be transformed to those in FIG. 7 by simple mechanical pressing.

Figure 8A:
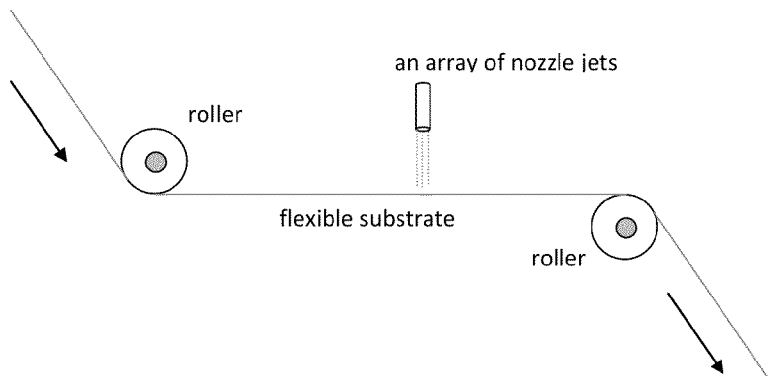
FIG. 8 illustrates the continuous process of depositing nanowires on flexible (8*a*) and rigid (8*b*) substrates.
Figure 8B:
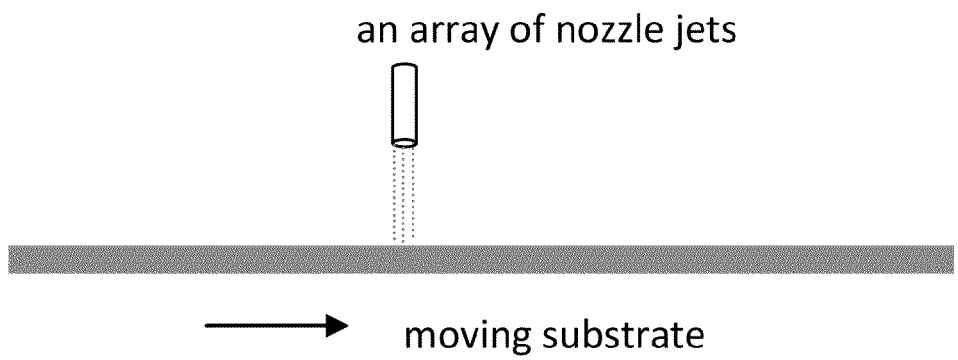

Large scale-up process can be achieved by (i) mixing the nanowires with solvent(s) and preparing them into a paint-like suspension; (ii) spraying the nanowires in solvent on a substrate in a continuous manner (similar to that in the newspaper printing); and (iii) sending the coated substrate for heat treatment and hydrogen reduction in the continuous process. FIG. 8 illustrates the steps for the continuous preparation of nanowires on a substrate. In FIG. 8a, a flexible substrate is shown. FIG. 8b shows the deposition technique for a rigid substrate, such as glass.

The conductive metal-coated nanowires and nanomesh of the present invention are suitable as materials for transparent conductive electrodes. The transparent conductive electrode based on the copper nanowires of the present invention will work as a substitute material for indium-tin-oxide (ITO), which is widely used in flat-panel display devices for TV, PC, lap-tops, hand-held electronic devices; touch-sensitive control panels; photovoltaic devices (solar cells); and smart windows. According to a recent cost analysis, the copper nanowire derived electrodes will significantly reduce production cost from approximately US $2500 per square meter using commercially available ITO nanowires to about a few US dollars per square meter with the nickel-coated copper nanowires described in the present invention. This cost analysis is based on the paper of: Adv. Mater. 2010, Volume 22, pp. 3558-3563, Aaron R. Rathmell, Stephen M. Bergin, Yi-Lei Hua, Zhi-Yuan Li, and Benjamin J. Wiley. Further, the transmittance of conductive copper nanowires is increased to over 80% by reducing the aggregation of the nanowires.

The invention claimed is:

1. A method of making a plurality of metal-coated copper nanowires, comprising:
   preparing an aqueous solution of sodium hydroxide (NaOH), copper ions, and a metal-containing compound;
   sequentially adding ethylenediamine (EDA) to the aqueous solution;
   sequentially adding hydrazine to the aqueous solution;
   mixing the aqueous solution; and
   heating the aqueous solution to produce a plurality of metal-coated copper nanowires.

2. The method according to claim 1, wherein an inorganic or organic salt containing copper ions, cupric nitrate (Cu$(NO_3)_2$), or copper chloride are a source of the copper ions.

3. The method according to claim 1, wherein the metal-containing compound comprises a metal selected from Gold (Au), Silver (Ag), Platinum (Pt), Palladium (Pd), Rhodium (Rh), Ruthenium (Ru), Cobalt (Co), or nickel (Ni).

4. The method according to claim 1, wherein the metal-containing compound is a metal salt.

5. The method according to claim 1, wherein the metal-containing compound is selected from an inorganic or organic salt containing nickel ions, nickel nitrate (Ni$(NO_3)_2$), or nickel chloride.

6. The method according to claim 1, wherein the heating occurs at a temperature of about 25° C. to about 100° C. for about 15 minutes to about 15 hours.

7. The method according to claim 6, wherein the temperature is about 60° C. to about 80° C.

8. The method according to claim 1, wherein the sodium hydroxide (NaOH) has a concentration of about 3.5 M to 15.0 M and a volume of about 20 to about 30 mL.

9. The method according to claim 1, wherein the copper ions have a concentration of about 0.10 M and a volume of about 0.1 to about 2.0 mL.

10. The method according to claim 1, wherein the ethylenediamine (EDA) is added at a volume of about 0.050 mL to about 2.0 mL, and the hydrazine is sequentially added at a volume of about 0.020 mL to about 1.0 mL.

11. The method according to claim 1, wherein the heating the aqueous solution is in a reactor and the reactor is in a water bath or any heating devices.

12. The method according to claim 11, wherein the reactor is composed of glass.

13. The method according to claim 11, wherein the reactor is composed of plastic or metals.

14. The method according to claim 1, wherein the method is a continuous process.

15. The method according to claim 1, wherein the method is a batch process.

16. The method according to claim 1, wherein the copper ions are cupric nitrate (Cu$(NO_3)_2$) and the metal-containing compound comprises nickel nitrate Ni$(NO_3)_2$,
   the sodium hydroxide (NaOH) has a concentration of about 7.0 M and a volume of about 30 mL;
   the cupric nitrate (Cu$(NO_3)_2$) has a concentration of about 0.10 M and a volume of about 0.1 to about 1.0 mL; and
   the nickel nitrate Ni$(NO_3)_2$ has a concentration of about 0.5 M and a volume of 0.07 mL to about 0.30 mL.

17. The method according to claim 1, wherein the copper ions are cupric nitrate (Cu$(NO_3)_2$), and wherein the cupric nitrate (Cu$(NO_3)_2$) has a concentration of about 0.5 M and a volume of about 0.07 to about 0.20 mL.

18. The method according to claim 1, wherein the volume of ethylenediamine (EDA) added is about 0.15 to 0.50 mL; and the volume of hydrazine added is about 0.025 mL to about 0.20 mL.

19. The method according to claim 1, wherein the heating is to a temperature of about 80° C. for about 1 hour.

20. The method according to claim 1, further comprising:
   removing the plurality of metal coated copper nanowires; and
   cooling the plurality of metal coated copper nanowires in air.

* * * * *